United States Patent [19]

Brown et al.

[11] Patent Number: 4,820,846

[45] Date of Patent: Apr. 11, 1989

[54] TRIARYLMETHANE COMPOUNDS, THEIR PREPARATION AND USE AS PHOTOCONDUCTIVE SYSTEMS

[75] Inventors: D. E. Brown, Stansted; Kenneth Reynolds, Chigwell, both of United Kingdom

[73] Assignee: Minnesota Mining and Manufacturing Company, St. Paul, Minn.

[21] Appl. No.: 531,020

[22] Filed: Sep. 12, 1983

[51] Int. Cl.[4] .......................................... C07D 209/82
[52] U.S. Cl. .................................. 548/420; 546/176; 546/272; 548/159; 548/418; 548/419; 350/342; 430/82; 430/83; 430/91; 430/95; 204/157.71
[58] Field of Search .............. 548/420, 159, 418, 419; 350/342; 546/272, 152, 176; 430/82, 83, 81, 95

[56] References Cited

U.S. PATENT DOCUMENTS

| | | | |
|---|---|---|---|
| 2,955,939 | 10/1960 | Brooker et al. | 96/105 |
| 3,637,861 | 1/1972 | Shelton | 568/422 |
| 3,647,432 | 3/1972 | Holstead | 430/82 |
| 3,764,315 | 10/1973 | Mort et al. | 430/94 |
| 3,824,099 | 7/1974 | Champ et al. | 430/58 |
| 3,877,935 | 4/1975 | Regensburg et al. | 430/58 |
| 4,025,341 | 5/1977 | Rule | 430/80 X |
| 4,254,032 | 3/1981 | Petipierre et al. | 548/420 X |
| 4,337,305 | 6/1982 | Beretta et al. | 430/82 |
| 4,361,637 | 11/1982 | Stofko, Jr. et al. | 430/80 X |
| 4,368,329 | 1/1983 | Katritzky | 549/13 |
| 4,384,034 | 5/1983 | Ferguson et al. | 430/83 |

Primary Examiner—Joseph Paul Brust
Attorney, Agent, or Firm—Donald M. Sell; Walter N. Kirn; Mark A. Litman

[57] ABSTRACT

Compounds which are useful as sensitizers of photoconductors, having the general formula:

(Abstract continued on next page.)

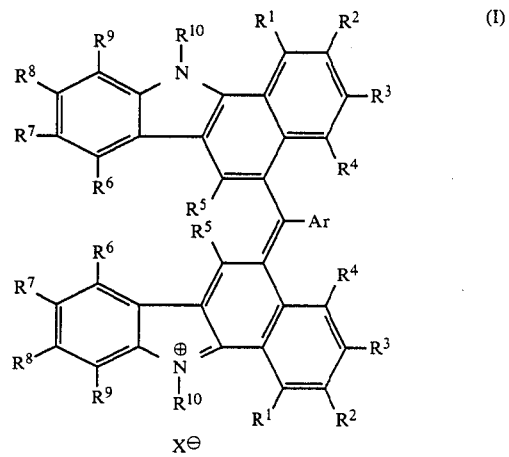

(I)

in which:
like symbols represent identical substituents,
at least 4 of $R^1$ to $R^9$ represent hydrogen atoms and the remaining $R^1$ to $R^9$ pairs of groups independently represent:
  (i) hydrogen, an alkyl group having from 1 to 18 carbon atoms, a substituted alkyl group, or an aryl or substituted aryl group,
  (ii) a halogen atom, a cyano group, a carboxy or alkoxycarbonyl group, a hydroxy group, an alkoxy group, a nitro group or a sulfonic acid group, providing that not more than two such groups (ii) are present in each ring,
  (iii) an acylamino group, a secondary acylamino group or a tertiary amino group in which the pendant substituent groups on the nitrogen atom are alkyl, aryl or aralkyl, providing not more than two such groups (iii) may be present in each benzocarbazole ring, and
  (iv) any two groups $R^1$ to $R^9$ on adjacent carbon atoms in a ring may represent the necessary atoms to complete a fused alicyclic, aromatic or heterocyclic ring,
$R^{10}$ represents an alkyl or substituted alkyl group, an aralkyl group, or an aryl or substituted aryl group,
Ar represents a heteroaromatic nucleus containing 5 or 6 members in the ring at least one of which is O, N or S, or an aromatic ring of the formula:

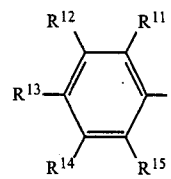

in which:
$R^{11}$ to $R^{15}$ independently represent a hydrogen or halogen atom, an alkyl, substituted alkyl, an aryl or substituted aryl, hydroxy, alkoxy or aryloxy group,
one of $R^{11}$ to $R^{15}$ may additionally represent an aldehyde or acetyl group, or a dialkylamino group,
up to two of $R^{11}$ to $R^{15}$ may additionally represent cyano, carboxy, alkoxycarbonyl, sulfonic acid or nitro group, and
any two adjacent $R^{11}$ to $R^{15}$ groups may represent the necessary atoms to complete a fused alicyclic, aromatic or heterocyclic ring, and
X represents an anion.

20 Claims No Drawings

TRIARYLMETHANE COMPOUNDS, THEIR PREPARATION AND USE AS PHOTOCONDUCTIVE SYSTEMS

FIELD OF THE INVENTION

This invention relates to dyes of the triarylmethane class which are derived from substituted benzo[a]carbazoles, to their preparation and their use as sensitizers for photoconduction in organic photoconductors, particularly for photoconduction sensitization to the long wavelength end of the spectrum, notably from 620 to 820 nm.

BACKGROUND OF THE INVENTION

Simple triarylmethane dyes have been disclosed for use in photoconductor formulations in "Quantum Efficiency of Photohole Generation in Dye-sensitized Polyvinylcarbazole", M. Ikeda, H. Sato, K. Morimoto and Y. Marukami, Phot. Sci. Eng. 19, 60 (1975). Carbazolylmethane dye salts as sensitizers for photoconductor compositions are disclosed in U.S. Pat. No. 3,647,432 and the use of poly-N-vinyl carbazle and its derivatives for dye-sensitization of organic photoconductors is disclosed in Z. Phys. Chem. Neue, Folg. 91, 13 to 24 (1974).

BRIEF DESCRIPTION OF THE INVENTION

It is an aspect of the present invention to provide triarylmethane compounds derived from substituted benzo[a]carbazoles which may be used as sensitizers for photoconduction in organic photoconductors.

Therefore, according to the present invention there is provided a compound of the general formula:

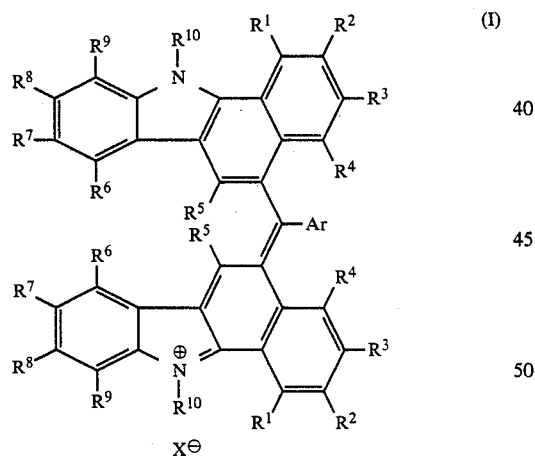

in which:
like symbols represent identical substituents,
at least 4 of $R^1$ to $R^9$ represent hydrogen atoms and the remaining $R^1$ to $R^9$ pairs of groups independently represent:
(i) hydrogen, an alkyl group having from 1 to 18 carbon atoms; e.g., methyl, ethyl, propyl, butyl, sec-butyl, hexyl, cyclohexyl, octyl, dodecyl; a substituted alkyl group, preferably a substituted lower alkyl group containing from 1 to 4 carbon atoms; e.g., a hydroxyalkyl group, an alkoxyalkyl group, a carboxyalkyl group, a haloalkyl group, an alkoxycarbonylalkyl group, a sulfoalkyl group, a perfluoroalkyl group; or an aryl or substituted aryl group; e.g., phenyl, tolyl, chlorophenyl, methoxyphenyl and naphthyl,
(ii) a halogen atom, a cyano group, a carboxy or alkoxycarbonyl group, a hydroxy group, an alkoxy group; e.g., methoxy, ethoxy, an aryloxy group; e.g., phenoxy, a nitro group or a sulfonic acid group, providing that not more than two such groups (ii) are present in each benzocarbazole ring,
(iii) an acylamino group; e.g., acetylamino, a secondary acylamino group; e.g., acetylmethylamino, or a tertiary amino group, in which the pendant substituent groups on the nitrogen atom are alkyl, aryl or aralkyl; e.g., $(CH_3)_2N—$, $(CH_3)(C_6H_5CH_2)N—$ and $(CH_3)(C_6H_5)N—$, providing not more than two such groups (iii) may be present in each benzocarbazole ring, and
(iv) any two groups $R^1$ to $R^9$ on adjacent carbon atoms in a ring may represent the necessary atoms to complete a fused alicyclic ring containing 5 to 7 carbon atoms, an aromatic ring or a heterocyclic ring containing 5 to 7 atoms selected from C, N, O and S, $R^{10}$ represents an alkyl or substituted alkyl group; e.g., methyl, ethyl and hydroxyethyl, an aralkyl group; e.g., benzyl and phenethyl, or an aryl or substituted aryl group; e.g., phenyl and tolyl.

Preferably the substituents $R^1$ to $R^{10}$ each contain up to 18 carbon atoms, usually up to 12 carbon atoms and more preferably up to 10 carbon atoms for cyclic groups and 4 carbon atoms for aliphatic groups.

Ar represents a heteroaromatic nucleus containing 5 or 6 members in the ring at least one of which is O, N or S; e.g., thiophene, pyridyl, quinolyl, benzothiazolyl, or an aromatic ring of the formula:

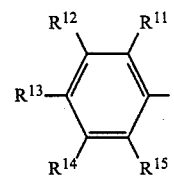

in which:
$R^{11}$ to $R^{15}$ independently represent a hydrogen or halogen atom, an alkyl or substituted alkyl group having up to 8 carbon atoms, an aryl or substituted aryl group having up to 8 carbon atoms, hydroxy, alkoxy or aryloxy group having up to 8 carbon atoms,
one of $R^{11}$ to $R^{15}$ may additionally represent an aldehyde group, an acetyl group or a dialkylamino group with up to 6 carbon atoms,
up to two $R^{11}$ to $R^{15}$ may additionally represent a cyano, carboxy, alkoxy carbonyl, sulfonic acid or nitro group, and
any two adjacent $R^{11}$ to $R^{15}$ groups may represent the necessary atoms to complete a fused alicyclic ring containing 5 to 7 carbon atoms, an aromatic ring or a heterocyclic ring having 5 to 7 atoms selected from C, N, O and S, and
X represents an anion; e.g., chloride, bromide, trifluoromethane sulfonate and preferably tetrafluoroborate or perchlorate.

Specific examples of $R^{11}$ and $R^{15}$ groups include those exemplified with respect to the groups $R^1$ to $R^9$. Preferred compounds are those in which $R^{13}$ is di-lower alkylamino; e.g., dimethylamino, diethylamino, alkoxy, methyl, ethyl or $NO_2$.

DETAILED DESCRIPTION OF THE INVENTION

The dyes of the invention may be prepared by oxidation of bis(benzo[a]carbazole-5-yl)aryl methanes. This oxidation may be effected by lead tetra-acetate in acetic acid and/or trifluoroacetic acid. The dyes may also be prepared by the photolysis of the bis(benzo[a]carbazol-5-yl)aryl methanes in chloroform solution.

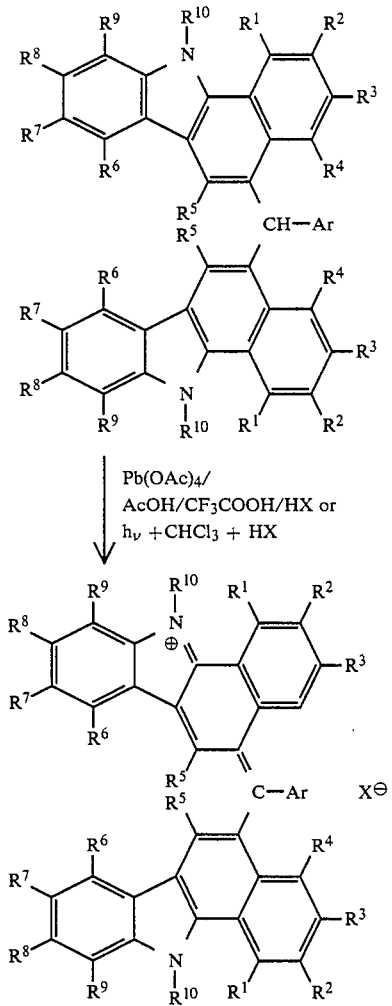

In both methods of preparation, the dyes, after isolation, tend to be contaminated to a greater or lesser degree by the starting triarylmethane which is very difficult to remove. The solubility of the dyes in normal recrystallization solvents is such that they cannot be recrystallized. For these reasons, elemental analyses are difficult to obtain.

The compounds of this invention are useful as sensitizers of photoconductors, and, in particular, for sensitization to the long wave end of the spectrum, for example, from 600 to 820 nm.

The photosensitive elements comprise a support having coated thereon a layer of electrically insulating film-forming resin. The resin may be photoconductive or may act as a binder for a photoconductive compound. The support is usually conductive or has an integral conductive layer thereon. The compounds of the invention are used as sensitizers to enhance the photoconduction of the layer.

Typical classes of photoconductive materials useful in electrophotography include:

(1) inorganic crystalline photoconductors; e.g., cadmium sulfide, cadmium sulfoselenide, cadmium selenide, zinc sulfide, zinc oxide and mixtures thereof, (2) inorganic photoconductive glasses; e.g., amorphous selenium, selenium alloys and selenium arsenic, and (3) organic photoconductors; e.g., phthalocyanine pigments and polyvinyl carbazole.

These organic materials may be used with or without binders and additives which extend their range of spectral sensitivity. Such photoconductive systems are well known in the art. U.S. Pat. No. 3,877,935 discusses various problems associated with the crystalline and amorphous classes of photoconductors and shows the use of polynuclear quinone pigments in a binder as a photoconductive layer; U.S. Pat. No. 3,824,099 discloses the use of squaric acid methine and triaryl pyrazoline compounds as an electrophotographic charge transport layer. Cadmium sulfoselenide plates are disclosed in U.S. Pat. No. 3,764,315, and one of the original disclosures of the use of poly-N-vinylcarbazole as a photoconductive insulating layer is provided in U.S. Pat. No. 3,037,861. A number of diverse organic photoconductors have been disclosed since the development of the carbazole class of photoconductors such as quinones and anthrones (e.g., Hayashi et al., Bull. Chem. Soc. Japan, Vol. 39, (1966) pages 1670 to 1673) but the carbazoles have continued to attract the greatest attention.

Carbazole condensates with aldehydes as disclosed in U.S. Pat. No. 4,025,351 are another useful class of organic photoconductors. Triaryl methanes including a carbazole moiety (as shown in Xerox Disclosure Journal, Vol. 3, No. 1, Jan/Feb, 1978, page 7) are also useful photoconductive insulators as are the materials of Japanese Patent Publication No. 52-34735.

A class of photoconductor for which the dyes of the invention are particularly useful is the bis(benzo[a]carbazolyl)aryl methanes. Although these compounds are the precursors of the dyes of the invention, they are themselves excellent charge transport photoconductors. Photoconductive systems incorporating these compounds are disclosed in U.S. Pat. No. 4,361,637.

Various binder materials known in the art are useful with electronically active donor compounds useful in the present invention. It is preferred that the binder be essentially optically transparent, particularly in the region in which the dye absorbs. Suitable binders include poly(vinyl chloride), poly(siloxanes), poly(vinyl butyral), poly(vinyl acetate), styrene/acrylonitrile copolymers, polyacrylates, polymethacrylates, polycarbonates, polyepoxides, polyurethanes, polyamides, polyethers, polyesters, polyolefins, as well as block, graft, random and alternating polymers, copolymers, terpolymers and mixtures thereof. The binders themselves are preferably electrically insulating film-forming polymers suitable for the formation of electrophotographic layers. The preferred polymeric binders are polycarbonates, polyacrylates, polyesters and styrene/acrylonitrile copolymers. Coating aids, lubricants, surface active agents, other sensitizing dyes and other adjuvants may be added to the composition.

For use of the materials of the present invention in electrophotographic layers, organic electron donor compounds should be present as at least 15 percent by weight of the composition. Preferably the donor compound should be present in the range 35 to 45 percent by weight of the layer, excluding the sensitizer dye. The sensitizing dyes should be used in amounts which will increase the sensitivity of the composition. This is defined as an effective sensitizing amount of dye. Generally amounts of from 0.01 to 10% by weight dye may be used. Amounts of dye as small as 0.005% by weight can increase the sensitivity of the electron donor compounds. Preferred concentration ranges are from 0.05 to 5% by weight.

The photosensitive materials of the present invention may also be useful as photoconductive toner, photovoltaic devices, organic semiconductors, and the like, and may use concentrations of organic electron donor compounds as low as 5% by weight.

The photosensitive elements are utilized by imposing a uniform electrostatic charge on the surface of the insulating layer, exposed the charged surface imagewise to light to dissipate the charge only in the light-struck areas thereby forming an electrostatic image on the surface. The charge pattern produced by the exposure is then developed by electrostatic toner, or alternatively is transferred to another surface and thereafter similarly developed. Either the charged or uncharged areas may be developed.

The invention will now be illustrated by the following Examples.

Tables 1A and 1B report the structure, yields and spectral data of compounds prepared in accordance with the procedures illustrated in Examples 1 to 3.

TABLE 1A

| Dye No. | $R^1$ | $R^2$ | $R^3$ | $R^4$ | $R^5$ | $R^6$ | $R^7$ | $R^8$ | $R^9$ | $R^{10}$ | X |
|---|---|---|---|---|---|---|---|---|---|---|---|
| 1 | H | H | H | H | H | H | H | H | H | Et | $BF_4$ |
| 2 | H | H | H | H | H | H | H | H | H | Et | $BF_4$ |
| 3 | H | H | H | H | H | H | H | H | H | Et | $BF_4$ |
| 4 | H | H | H | H | H | H | H | H | H | Et | $BF_4$ |
| 5 | H | H | H | H | H | H | H | H | H | Et | $BF_4$ |
| 6 | H | H | H | H | H | H | H | H | H | Et | $BF_4$ |
| 7 | H | H | H | H | H | H | H | H | H | Et | $BF_4$ |
| 8 | H | H | H | H | H | H | H | H | H | Et | $BF_4$ |
| 9 | H | H | H | H | H | H | H | H | H | Et | $BF_4$ |
| 10 | H | H | H | H | H | H | H | H | H | Et | $BF_4$ |
| 11 | H | H | H | H | H | H | H | H | H | Et | $BF_4$ |
| 12 | H | H | H | H | H | H | H | H | H | Et | $BF_4$ |
| 13 | H | H | H | H | H | H | H | H | H | Et | $BF_4$ |
| 14 | H | H | H | H | H | H | H | H | H | Et | $BF_4$ |
| 15 | H | H | H | H | H | H | H | H | H | Et | $BF_4$ |
| 16 | H | H | H | H | H | H | H | H | H | Et | $BF_4$ |
| 17 | H | H | H | H | H | H | H | H | H | Et | $BF_4$ |
| 18 | H | H | H | H | H | H | H | H | H | Et | $CF_3SO_3^-$ |
| 19 | H | H | H | H | H | H | H | H | H | Et | $BF_4$ |
| 20 | H | H | H | H | H | H | H | H | H | Et | $BF_4$ |
| 21 | H | MeO | H | H | H | H | H | H | H | Et | $BF_4$ |
| 22 | H | MeO | H | H | H | H | H | H | H | Et | $BF_4$ |
| 23 | H | MeO | H | H | H | H | H | H | H | Et | $BF_4$ |
| 24 | H | H | MeO | H | H | H | H | H | H | Et | $BF_4$ |
| 25 | H | H | MeO | H | H | H | H | H | H | Et | $BF_4$ |
| 26 | H | H | MeO | H | H | H | H | H | H | Et | $BF_4$ |
| 27 | H | H | H | MeO | H | H | H | H | H | Et | $BF_4$ |
| 28 | H | H | H | MeO | H | H | H | H | H | Et | $BF_4$ |
| 29 | H | H | H | MeO | H | H | H | H | H | Et | $BF_4$ |
| 30 | H | H | H | H | H | H | MeO | H | H | Et | $BF_4$ |
| 31 | H | H | H | H | H | H | MeO | H | H | Et | $BF_4$ |
| 32 | H | MeO | H | H | H | H | Me | H | H | Et | $BF_4$ |
| 33 | H | H | MeO | H | H | H | Me | H | H | Et | $BF_4$ |
| 34 | H | H | H | H | H | H | Ph | H | H | Et | $BF_4$ |
| 35 | H | H | H | H | H | —CH=CH—CH=CH— | | H | H | Et | $BF_4$ |
| 36 | H | H | H | H | H | H | H | H | H | Et | $BF_4$ |
| 37 | H | H | H | H | H | H | H | H | H | Et | $BF_4$ |
| 38 | H | H | H | H | H | H | H | H | H | Et | $BF_4$ |

TABLE 1B

| Dye No. | $R^{11}$ | $R^{12}$ | $R^{13}$ | $R^{14}$ | $R^{15}$ | Yield % | $\lambda_1$ nm | Log $\epsilon_1$ | $\lambda_2$ nm | Log $\epsilon_2$ |
|---|---|---|---|---|---|---|---|---|---|---|
| 1 | H | H | H | H | H | 48 | 510 | 3.76 | 745 | 4.23 |
| 2 | Me | H | H | H | H | 48 | 502 | 3.95 | 737 | 4.57 |
| 3 | MeO | H | H | H | H | 36 | 548 | 3.40 | 726 | 3.72 |
| 4 | Cl | H | H | H | H | 61 | 466 | 3.87 | 750 | 4.48 |
| 5 | $NO_2$ | H | H | H | H | 46 | 486 | 3.89 | 784 | 4.41 |
| 6 | H | MeO | H | H | H | — | 515 | — | 730 | — |
| 7 | H | PhO | H | H | H | — | 518 | — | 740 | — |
| 8 | H | $NO_2$ | H | H | H | 10 | 496 | 3.71 | 774 | 4.07 |
| 9 | H | H | Me | H | H | 79 | 528 | 4.04 | 736 | 4.46 |
| 10 | H | H | MeO | H | H | 45 | 548 | 4.32 | 706 | 4.61 |
| 11 | H | H | Cl | H | H | 54 | 514 | 3.99 | 750 | 4.46 |
| 12 | H | H | OH | H | H | 59 | 559 | 4.35 | 680 | 4.30 |
| 13 | H | H | $NMe_2$ | H | H | 88 | — | — | 600–650 | 4.26 |
| 14 | H | H | $NEt_2$ | H | H | 47 | — | — | 650 | 4.54 |
| 15 | H | H | $NO_2$ | H | H | 70 | 504 | 3.85 | 786 | 4.32 |

TABLE 1B-continued

| Dye No. | $R^{11}$ | $R^{12}$ | $R^{13}$ | $R^{14}$ | $R^{15}$ | Yield % | $\lambda_1$ nm | Log $\epsilon_1$ | $\lambda_2$ nm | Log $\epsilon_2$ |
|---|---|---|---|---|---|---|---|---|---|---|
| 16 | H | H | CHO | H | H | — | 511 | — | 749 | — |
| 17 | H | MeO | MeO | H | H | 33 | 576 | 3.77 | 712 | 3.67 |
| 18 | Cl | H | NO$_2$ | H | H | 49 | — | — | 782 | 3.83 |
| 19 | H | NO$_2$ | Cl | H | H | 22 | 506 | 3.66 | 770 | 4.12 |
| 20 | H | MeO | MeO | MeO | H | 51 | 570 | 4.24 | 736 | 4.58 |
| 21 | H | H | MeO | H | H | 49 | 558 | 4.25 | 730 | 4.61 |
| 22 | H | H | Cl | H | H | 47 | 530 | 4.09 | 770 | 4.67 |
| 23 | H | H | NO$_2$ | H | H | 33 | 520 | 3.86 | 810 | 4.34 |
| 24 | H | H | MeO | H | H | 29 | 545 | 3.78 | 712 | 3.61 |
| 25 | H | H | Cl | H | H | 44 | 402 | 4.01 | 756 | 4.38 |
| 26 | H | H | NO$_2$ | H | H | 42 | 488 | 3.94 | 794 | 4.23 |
| 27 | H | H | MeO | H | H | — | 490 to 670 | | | — |
| 28 | H | H | Cl | H | H | — | — | — | 695 | — |
| 29 | H | H | NO$_2$ | H | H | — | — | — | 735 | — |
| 30 | H | H | MeO | H | H | — | 554 | — | 719 | — |
| 31 | H | H | NO$_2$ | H | H | 45 | 510 | 3.83 | 804 | 4.32 |
| 32 | H | H | NO$_2$ | H | H | 19 | 510 | 3.87 | 802 | 4.15 |
| 33 | H | H | NO$_2$ | H | H | 62 | — | — | 724 | 3.21 |
| 34 | H | H | H | H | H | 45 | 514 | 3.97 | 752 | 4.45 |
| 35 | H | H | H | H | H | 44 | 500 | 3.67 | 768 | 3.99 |
| 36 | F | F | F | F | F | 64 | 492 | 3.89 | 802 | 4.48 |
| 37 | (structure: tetrahydroquinoline N-Et) | | | | | 44 | — | 4.61 | 640 | — |
| 38 | (structure: thiophene) | | | | | 18 | 553 | 3.99 | 750 | 4.36 |

EXAMPLE 1

Preparation of bis (11-ethylbenzo[a]carbazol-5-yl)phenylmethyl tetrafluoroborate—Dye No. 1

Bis(11-ethylbenzo[a]carbazol-5-yl)phenylmethane (1.0 g) was suspended in a mixture of acetic acid (15 ml) and trifluoroacetic acid (10 ml). Lead tetraacetate (1.5 g) was then added and the mixture stirred at 25° C. for six hours. The filtered reaction mixture was stirred for ten minutes with aqueous tetrafluoroboric acid (2 ml 40% HBF$_4$) and then poured into ether (15 ml). The finely precipitated dye was filtered and washed with ether. The dye was purified by dissolving in dichloromethane (10 ml) and after filtration to remove any insoluble lead salts was reprecipitated with ether. The solid dye was filtered, well washed with ether and dried. Yield: 0.55 g (48%), $\lambda_1$ (CHCl$_3$), 510 μm Log $\epsilon_1$, 3.76; $\lambda_2$ 745 nm, Log $\epsilon_2$, 4.23.

Dye Nos. 2, 4, 5, 8, 9, 10, 13, 14, 15, 17, 19, 20, 21, 22, 23, 24, 25, 26, 31, 32, 33, 34, 35, 36 and 37 were prepared by a similar procedure from the appropriately substituted bis(benzo[a]carbazol-5-yl)aryl methane. Yields and spectral data are reported in Tables 1A and 1B.

EXAMPLE 2

Preparation of bis(11-ethylbenzo[a]carbazol-5-yl) (2-chloro-5-nitrophenyl)methyl trifluoromethane sulfonate—Dye No. 18

Bis(11-ethylbenzo[a]carbazol-5-yl) (2-chloro-5-nitrophenyl)methane (1.0 g) was suspended in a mixture of acetic acid (20 ml) and trifluoromethane sulfonic acid (2.0 ml). Lead tetraacetate (1.5 g) was added and the mixture stirred at 25° C. for four hours. The mixture was then poured into water (150 ml) containing sodium sulfate (1 g). The precipitated solid was filtered, washed with water and dried. Th dye was removed from this solid by extraction with dichloromethane (15 ml). After filtration from insoluble lead salts, the dye was precipitated from the dichloromethane solution by ether (75 ml). The dye was filtered, well washed with ether was dried. Yield: 0.6 g (49%), $\lambda_{max}$ (CHCl$_3$) 782 nm; Log $\epsilon_{max}$ 3.83.

EXAMPLE 3

Preparation of bis(11-ethylbenzo[a]carbazol-5-yl) (4-chlorophenyl)methyl tetrafluoroborate—Dye No. 11.

Bis(11-ethylbenzo[a]carbazol-5-yl) (4-chlorophenyl)methane (0.1 g) was dissolved in chloroform (50 ml) containing a few drops of acetic acid. The solution was stirred and exposed to the light from a mercury-vapor lamp for five hours. A few drops of tetrafluoroboric acid (40%) were added and the mixture well shaken and then evaporated to dryness. The residue was dissolved in dichloromethane (2 ml) and the dye precipitated by addition of ether (15 ml). The dye was filtered, well washed with ether and dried.

Yield: 0.075 g (54%), $\lambda_1$ (CHCl$_3$) 514 nm, Log $\epsilon$ 3.99; $\lambda_2$ 750 nm, Log $\epsilon_2$ 4.46.

Dye Nos. 3, 12 and 38 are prepared by a similar procedure from the appropriately substituted bis(benzo[a]carbazol-5-yl)aryl methane. Yields the spectral data are reported in Tables 1A and 1B.

The spectral data given in Tables 1A and 1B for Dye Nos. 6, 7, 16, 27, 28, 29 and 30 were obtained by photolysis of the corresponding base in chloroform but these dyes were not isolated.

EXAMPLE 4

A general formulation which was used for the preparation of these photoconductive layers was as follows:

1.2 g of a polyester resin (Vitel P.E. 207 commercially available from Goodyear Chemicals) was dissolved in a mixture of dichloromethane (6 ml) and 1,2-dichloroethane (6 ml). To this solution was added the photoconductor (1.0 g). When this had dissolved the dye was added in an amount shown in the following Table 2. The mixture was then coated onto a suitable electrical conducting material to give a layer thickness when dried of 10 microns. The preferred layer thickness may vary between 1 and 30 microns.

Suitable supports for the photoconductive layer may be a metal; e.g., aluminium foil, or a polyester film coating with a metal; e.g., aluminium or nickel, or a polyester film coated with a transparent conductive oxide composition. An example of the latter is an indium/tin oxide coated polyester film commercially available under the trade name Intrex Film, Type K-HC, from Sierracin Corporation, U.S.A., and the results given in Table 2 are for materials coated on this base.

The photoconductors exemplified as A to I in Table 2 are as follows:

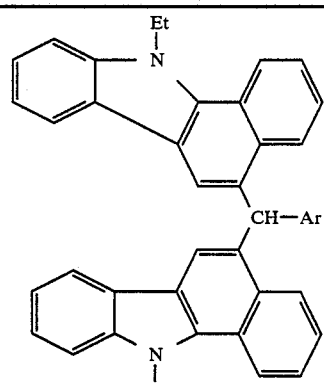

General formula of Photoconductors A to H

| Photoconductor | Ar |
|---|---|
| A | $C_6H_5$ |
| B | p-$CH_3O.C_6H_4$ |
| C | p-$Cl.C_6H_4$ |
| D | p-$O_2N.C_6H_4$ |
| E | m-$O_2N.C_6H_4$ |
| F | 3,4-$(MeO)_2C_6H_3$ |
| G | 3,4,5-$(MeO)_3C_6H_2$ |
| H | $C_6F_5$ |
| I | |

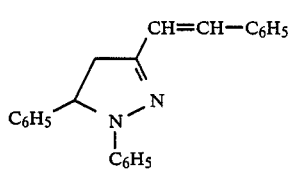

The test materials were charged to a potential ($V_s$) by means of corona device and then exposed to the light from a tungsten lamp, either without a filter or through a narrow-cut spectral filter. The figures given for half-decay in Table 2 are the exposure necessary to reduce the initial potential $V_s$ to half the value, $V_s/2$. As may be seen from these results the dyes are particularly useful for the sensitization of bis(benzo[a]carbazol-5-yl)aryl methanes to the spectral region 640 to 820 nm. This is of particular value for use with modern laser light sources; e.g., a He/Ne gas laser or a laser-diode source.

Compound Nos. 1, 10, 11, 13, 14, 15, 21, 31, 37 and 38 are preferred sensitizers for use in the invention.

TABLE 2

| Dye No. | Weight % Dye | Photoconductor | Polymer | $V_s$ volts | Half decay Ergs/cm$^2$ | Filter λmax nm |
|---|---|---|---|---|---|---|
| 1 | 0.2 | A | Vitel P.E. 200 | 650 | 172 | 740 |
| 2 | 0.9 | A | Vitel P.E. 207 | 680 | 150 | 740 |
| 8 | 0.4 | A | Vitel P.E. 200 | 650 | 127 | 790 |
| 10 | 0.4 | A | Vitel P.E. 200 | 950 | 28 | 790 |
| 10 | 0.5 | B | Vitel P.E. 207 | 640 | 101 | 740 |
| 10 | 0.6 | I | Vitel P.E. 207 | 440 | 169 | 700 |
| 11 | 0.5 | A | Vitel P.E. 200 | 600 | 480 | white light |
| 11 | 0.5 | B | Vitel P.E. 200 | 600 | 610 | white light |
| 11 | 0.5 | C | Vitel P.E. 200 | 600 | 420 | white light |
| 11 | 0.5 | D | Vitel P.E. 200 | 600 | 480 | white light |
| 11 | 0.5 | E | Vitel P.E. 200 | 600 | 510 | white light |
| 11 | 0.5 | F | Vitel P.E. 200 | 600 | 820 | white light |
| 11 | 0.5 | G | Vitel P.E. 200 | 600 | 750 | white light |
| 11 | 0.5 | A | Vitel P.E. 200 | 500 | 58 | 740 |
| 13 | 0.5 | A | Vitel P.E. 200 | 630 | 64 | 670 |
| 14 | 0.1 | A | Vitel P.E. 207 | 660 | 180 | 640 |
| 14 | 0.3 | A | Vitel P.E. 207 | 635 | 112 | 640 |
| 14 | 0.5 | A | Vitel P.E. 207 | 580 | 96 | 640 |
| 14 | 0.9 | A | Vitel P.E. 207 | 540 | 70 | 640 |
| 14 | 1.4 | A | Vitel P.E. 207 | 440 | 114 | 640 |
| 14 | 0.6 | B | Vitel P.E. 207 | 705 | 99 | 670 |
| 14 | 0.6 | I | Vitel P.E. 207 | 530 | 129 | 670 |
| 15 | 0.5 | A | Vitel P.E. 200 | 820 | 92 | 790 |
| 21 | 0.9 | A | Vitel P.E. 207 | 426 | 334 | 740 |
| 22 | 0.4 | A | Vitel P.E. 207 | 910 | 85 | 790 |
| 23 | 1.6 | A | Vitel P.E. 207 | 720 | 396 | 790 |
| 25 | 1.5 | A | Vitel P.E. 207 | 720 | 157 | 740 |
| 26 | 2.2 | A | Vitel P.E. 207 | 580 | 295 | 790 |
| 31 | 0.6 | A | Vitel P.E. 207 | 570 | 585 | 820 |
| 31 | 1.3 | A | Vitel P.E. 207 | 570 | 482 | 820 |
| 31 | 1.9 | A | Vitel P.E. 207 | 565 | 495 | 820 |
| 32 | 0.4 | A | Vitel P.E. 207 | 846 | 480 | 820 |
| 32 | 0.9 | A | Vitel P.E. 207 | 775 | 260 | 820 |
| 34 | 0.6 | A | Vitel P.E. 207 | 640 | 140 | 820 |
| 34 | 0.6 | H | Vitel P.E. 207 | 700 | 614 | 820 |
| 37 | 0.6 | A | Vitel P.E. 207 | 820 | 66 | 640 |
| 38 | 0.5 | A | Vitel P.E. 207 | 630 | 112 | 740 |

TABLE 2-continued

| Dye No. | Weight % Dye | Photoconductor | Polymer | $V_s$ volts | Half decay Ergs/cm² | Filter λmax nm |
|---|---|---|---|---|---|---|
| | | | 200 | | | |

We claim:
1. A compound of the general formula:

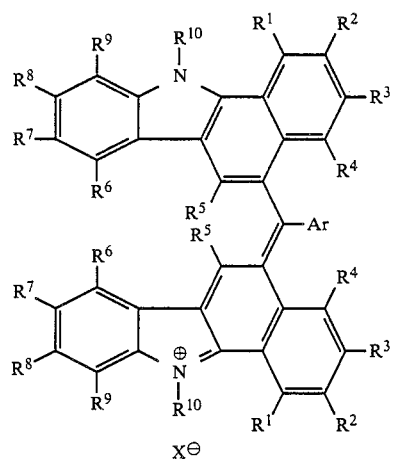

in which:
like symbols represent identical substituents,
at least 4 of $R^1$ to $R^9$ represent hydrogen atoms and the remaining $R^1$ to $R^9$ pairs of groups independently represent:
  (i) hydrogen, an alkyl group having from 1 to 18 carbon atoms, a substituted alkyl group, or an aryl or substituted aryl group,
  (ii) a halogen atom, a cyano group, a carboxy or alkoxycarbonyl group, a hydroxy group, an alkoxy group, a nitro group or a sulfonic acid group, providing that not more than two such groups (ii) are present in each ring,
  (iii) an acylamino group, a secondary acylamino group or a tertiary amino group in which the pendant substituent groups on the nitrogen atom are alkyl, aryl or aralkyl, providing not more than two such groups (iii) may be present in each benzocarbazole ring, and
  (iv) any two groups $R^1$ to $R^9$ on adjacent carbon atoms in a ring may represent the necessary atoms to complete a fused alicyclic, aromatic or heterocyclic ring,
$R^{10}$ represents an alkyl or substituted alkyl group, an aralkyl group, or an aryl or substituted aryl group,
Ar represents a heteroaromatic nucleus containing 5 or 6 members in the ring at least one of which is O, N or S, or an aromatic ring of the formula:

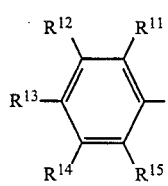

in which:

$R^{11}$ to $R^{15}$ independently represent a hydrogen or halogen atom, an alkyl, substituted alkyl, an aryl or substituted aryl, hydroxy, alkoxy or aryloxy group,
one of $R^{11}$ to $R^{15}$ may additionally represent an aldehyde or acetyl group, or a dialkylamino group,
up to two of $R^{11}$ to $R^{15}$ may additionally represent a cyano, carboxy, alkoxycarbonyl, sulfonic acid or nitro group, and
any two adjacent $R^{11}$ to $R^{15}$ groups may represent the necessary atoms to complete a fused alicyclic, aromatic or heterocyclic ring, and
X represents an anion.

2. A compound as claimed in claim 1, characterized in that X represents chloride, bromide or trifluoromethane sulfonate.

3. A compound as claimed in claim 1, characterized in that X represents tetrafluoroborate or perchlorate.

4. A compound as claimed in claim 1, characterized in that $R^1$ to $R^9$ are each hydrogen.

5. A compound as claimed in claim 1, characterized in that $R^{10}$ is ethyl.

6. A compound as claimed in claim 1, characterized in that at least three of $R^{11}$ to $R^{15}$ are hydrogen.

7. A compound as claimed in claim 1, characterized in that $R^{13}$ is dialkylamino, alkoxy or $NO_2$.

8. A method of preparing a dye as claimed in claim 1, characterized in that bis(benzo[a]carbazol-5-yl)aryl methane is converted to the desired compound in accordance with the reaction scheme:

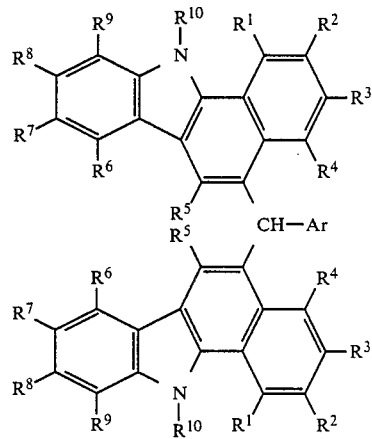

-continued

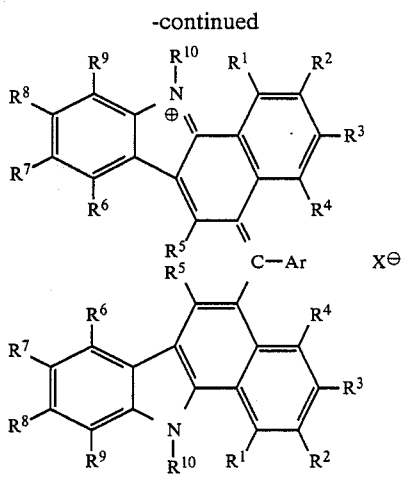

in which $R^1$ to $R^{10}$ and Ar are as defined in claim 1, by oxidation utilizing lead tetra-acetate in the presence of acetic acid and/or trifluoroacetic acid or by photolysis in chloroform solution.

9. A photosensitive element comprising a support the surface of which is electrically conducting or is made electrically conductive by the provision of a conductive layer, the electrically conductive surface having coated thereon a photosensitive layer comprising a photoconductive material and as a sensitizer a compound of claim 1.

10. A photosensitive element as claimed in claim 9, characterized in that said compound is present in an effective sensitizing amount in the range of 0.01 to 10% by weight of the photosensitive layer.

11. A photosensitive element as claimed in claim 10, in which the photosensitive layer comprises a bis(benzo[a]carbazol-5-yl)aryl methane.

12. A photosensitive element as claimed in claim 11, in which the photosensitive layer comprises a bis(benzo[a]carbazol-5-yl)phenyl methane.

13. A photosensitive element as claimed in claim 9, in which the photosensitive layer comprises a bis[benzo[a]carbazol-5-yl)aryl methane.

14. A photosensitive element as claimed in claim 10, in which the photosensitive layer comprises a bis(benzo[a]carbazol-5-yl)phenyl methine.

15. A compound as claimed in claim 2, characterized in that $R^1$ to $R^9$ are each hydrogen.

16. A compound as claimed in claim 3, characterized in that $R^1$ to $R^9$ are each hydrogen.

17. A compound as claimed in claim 2, characterized in that $R^{10}$ is ethyl.

18. A compound as claimed in claim 3, characterized in that $R^{10}$ is ethyl.

19. A compound as claimed in claim 17, characterized in that at least three of $R^{11}$ to $R^{15}$ are hydrogen.

20. A compound as claimed in claim 18, characterized in that at least three of $R^{11}$ to $R^{15}$ are hydrogen.

* * * * *